Oct. 22, 1946.                    J. L. HARRAH                    2,409,852
                     PISTON FOR INTERNAL-COMBUSTION ENGINES
                            Filed March 19, 1945

Inventor
John L. Harrah

Patented Oct. 22, 1946

2,409,852

UNITED STATES PATENT OFFICE 2,409,852

PISTON FOR INTERNAL-COMBUSTION ENGINES

John L. Harrah, Akron, Ohio

Application March 19, 1945, Serial No. 583,545

4 Claims. (Cl. 309—14)

This invention relates to pistons, but more particularly to a sectional piston construction, especially adapted for use in internal combustion engines, automobile, truck, bus, tractor, and in fact other types of engines.

The piston rings now used in internal combustion engines are positioned in new ring grooves at an exact fit, with a close precision clearance. After a limited number of miles of engine wear, the piston rings wear the top and bottom surfaces of the ring grooves.

When the rings are loose in the grooves they will allow the motor oil from the crank-case, to pass under the rings, to the back of the rings, and out across the top. Because of the heat, part of this oil will carbonize and the balance will pass to the combustion chamber. The carbon lodging around and in the back of the rings will cause the loss of their resiliency and they become a sludged dead weight. Part of the oil which has proceeded to the combustion chamber will also carbonize and it will not let the valves seat properly. The rest of the oil in the combustion chamber will foul the spark plugs and then pass unused out through the exhaust.

After the piston rings have lost their resiliency and have become weighted with sludge and carbon, they cannot retain the oil in the crank-case, holding the compressed gases above the pistons, nor control the blow-by.

When the engines are equipped with removable head pistons, at any time, the accumulated carbon can be removed, the valves ground, and new rings installed, in one operation, from the top of the motor. With new rings properly working in new grooves, they will hold the compressed gases above the pistons, control the blow-by, and retain the motor oil in the crank-case, which will insure proper lubrication of the other moving parts of the motor at all times.

The object of this invention is, therefore, the effecting of means whereby the piston rings may be removed and renewed from the top of the motor, without thus removing the entire piston, nor disturbing the other assembled parts and mountings of the engine.

Another object of the invention is to provide a sectional piston whereby the top portion, in which the rings are carried, can be obtained separately from the skirt portion, with new piston rings properly assembled.

The invention is fully disclosed in the following specification, of which the accompanying drawing forms a part, in which the separate parts of the piston improvement are designated by suitable reference characters in each of the views, and in which.

Figure 2:
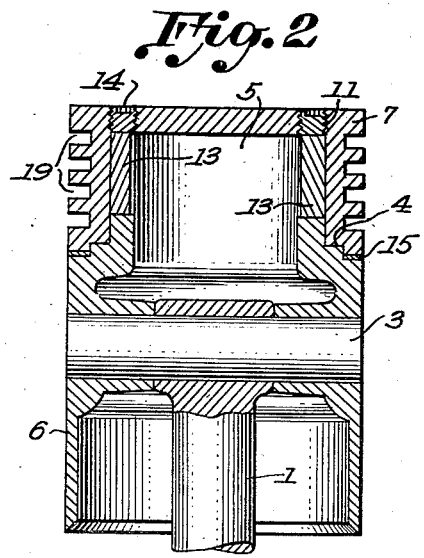
Figure 2 is a sectional view on the line 2—2 of Figure 1, showing the wrist pin and connecting rod in position.
Figure 1:
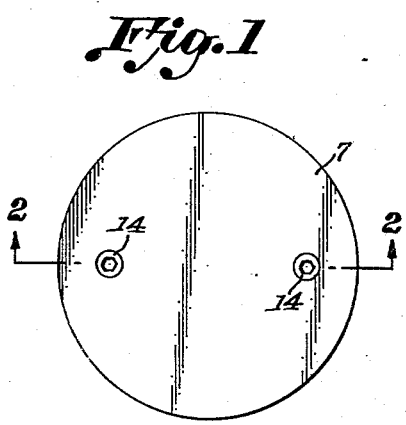
Figure 1 is a top plan view of the removable piston head assembled.
Figure 3:
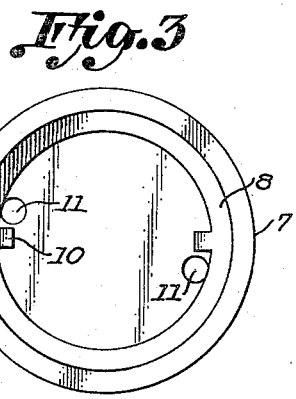
Figure 3 is a bottom plan view of the top portion.
Figure 4:
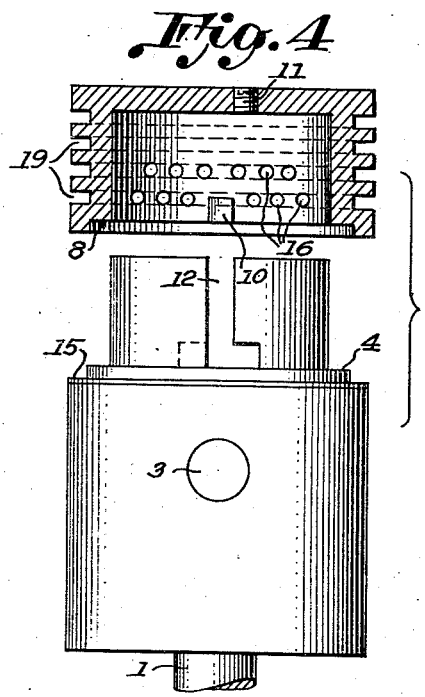
Figure 4 is a side view of the piston showing immediately above it the removable head portion in section.
Figure 6:
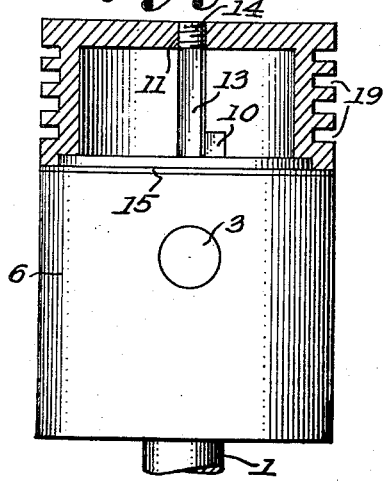
Figure 6 is a side view of the piston assembled with a detail sectional view of the ring section showing the lock-thread set screw and the fillers in position.
Figure 5:
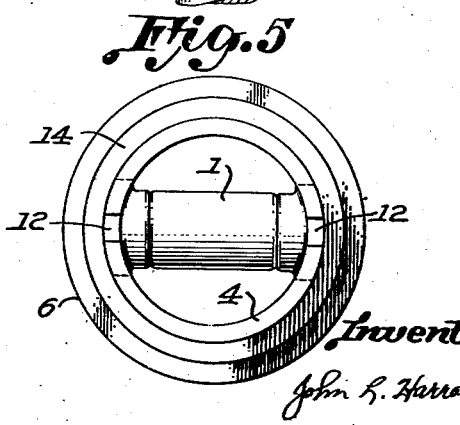
Figure 5 is a top plan view of the skirt section.

In this illustrative construction I have shown for the purpose of carrying my invention into effect, Figure 2 a well known trunk type piston having the connecting rod 1 connected thereto by the wrist pin bearings 3. The main body of this piston, is of course, of cylindrical construction, open at both axial ends, the lower portion of said body forming a skirt, and the upper portion the ring section.

The skirt section 6, open at both axial ends, a wall at the upper end thereof, said wall having an inward, upward projecting hollow neck 5; said hollow neck having complemental L shaped apertures 12—12, with the long sides of the L open and extending upward centrally spaced directly above the wrist pin boss centers; said piston skirt wall having an annular recessed shoulder 4 somewhat smaller in diameter than the interior of the ring section, while the exterior of both portions are alike.

The ring section 7, a hollow cylindrical portion, having an upper wall, said ring section being open at the lower end, with a corresponding annular recessed shoulder 8. In the periphery of the ring section, a plurality of annular spaced ribs forming intermediate thereof piston ring receiving grooves 19. Centrally spaced inside the ring section are complemental ribs 10—10; for lubrication purposes said ring section provided with a circumferentially extending series of bores 16 which extend through the wall thereof from the inner wall of the two lower grooves, namely the oil ring and the compression ring grooves.

The rectangle shaped fillers 13 are formed to pass through the holes 11—11 in the ring section, into the open ends of the L shaped apertures in the skirt section 12—12. By screwing downwardly the lock-thread set screws 14 into the screw holes 11—11 thus provided, the said inserts are held firmly in position.

To insure a gas tight fit between the ring section and the skirt section, the bearing surface of same are thus sealed with a plain copper gasket 15.

Thus constructed, to securely fasten the ring section 7 upon the skirt section 6 of the piston, slip said ring section 7, with the ribs 10—10 in direct alignment with the open ends of the L shaped apertures 12—12 in the skirt section, down about the hollow neck of the piston; by rotating the ring section a partial turn the ribs 10—10 are positioned snugly into the parallel cavities of the L shaped apertures in the skirt section.

To additionally secure the ring section in this position, through the holes 11—11 in the face of the piston top, lower the fillers 13 into the long sides of the L shaped apertures in the skirt section, then screw the lock-thread set screws 14 downward into suitable tapped bores in said piston top, thus no vibration nor direct pull can separate the two sections.

The illustrative construction shown may be modified in various respects without departing from the spirit of my invention, and it will be understood that it is my intention to include all such modifications in the scope of the appended claims.

What I claim as new and desire to secure by Letters Patent is:

1. In a piston, a hollow cylindrical body, open at both axial ends, the lower portion of said body forming a skirt, wrist pin bearings in said body positioned immediately above said skirt; the upper portion of said body of smaller diameter to form an upward presented, stepped, shoulder, with an upward, projecting hollow neck; and a co-axially arranged reduced portion; said hollow neck having complemental L shaped apertures; a cylindrical top portion provided with ring mounting grooves; said ring section having a top wall and a side wall enclosing a downwardly presented cavity; the lower edge of said wall being stepped to fit on said shoulder; said ring section provided with complemental ribs which project inward from the side wall thereof for interlocking connections with said L shaped apertures on said reduced portion by a rotary movement of said section; inserts positioned through suitable bores in said top wall snugly received in said L shaped apertures in skirt section; said inserts securely held in position with application of lock-thread set-screws firmly screwed into suitable tapped bores in piston top.

2. In a piston, a hollow cylindrical skirt portion, a wall at the upper end thereof, open at both axial ends, an inwardly recessed hollow neck projecting upward from said wall, having complemental L shaped apertures; a hollow cylindrical ring section, having an upper wall, said ring section being open at the lower end, said ring section provided with a plurality of spaced, parallel, circumferentially extending ribs forming grooves therebetween for receiving piston rings; said ring section provided with complemental ribs which project inwardly from the side wall thereof for inter-locking connections with said L shaped apertures in said skirt section by rotating said ring section a partial turn; through suitable bores in top wall of said ring section, means thus to prevent rotation of ring section while the piston is in motion.

3. In a piston, a skirt portion, open at both axial ends, having a hollow neck at its upper end thereof; a removable ring section, whereby the piston rings may be carried; complemental ribs diametrically located in the interior of said ring section said skirt portion having complemental L shaped apertures for snugly receiving said complemental ribs on said ring section, engageable by a partial rotation of said ring section; inserts lowered through face of said piston top, received in said skirt apertures, to firmly engage said detachable sections.

4. In a piston, a skirt portion, open at both axial ends, having a hollow neck at its upper end thereof; a removable ring section for oil and compression rings, whereby the piston rings may be carried; complemental ribs diametrically located in the interior of said ring section; said skirt portion having complemental L shaped apertures for snugly receiving said complemental ribs of said ring section; engageable by a partial rotation of said ring section; means operable from the upper face of said ring section for detachably securing the ring section upon said skirt section; said ring section provided with a circumferentially extending series of bores which extend through the wall thereof from the inner wall of the oil ring and the compression ring grooves.

JOHN L. HARRAH.